(12) United States Patent
Kraemer et al.

(10) Patent No.: US 11,521,276 B2
(45) Date of Patent: Dec. 6, 2022

(54) DECENTRALIZED COMPUTING WITH AUDITABILITY AND TAXABILITY

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 15/413,760

(22) Filed: Jan. 24, 2017

(65) Prior Publication Data
US 2018/0211332 A1 Jul. 26, 2018

(51) Int. Cl.
*G06Q 40/00* (2012.01)
*H04L 67/53* (2022.01)
(Continued)

(52) U.S. Cl.
CPC .......... *G06Q 40/123* (2013.12); *G06Q 20/00* (2013.01); *G06Q 20/065* (2013.01); *G06Q 40/10* (2013.01);
(Continued)

(58) Field of Classification Search
None
See application file for complete search history.

(56) References Cited

U.S. PATENT DOCUMENTS 6,332,163 B1 * 12/2001 Bowman-Amuah ........................ H04L 12/4604 709/217
6,633,560 B1 * 10/2003 Albert .................... H04L 29/06 370/351

(Continued)

FOREIGN PATENT DOCUMENTS

WO   WO-2016048143 A1 *  3/2016   ............. H04L 41/12

OTHER PUBLICATIONS

Valancius, "Wide-area route control for online services", Georgia Institute of Technology, May 2012. (Year: 2012).*

(Continued)

*Primary Examiner* — Neha Patel
*Assistant Examiner* — Clay C Lee
(74) *Attorney, Agent, or Firm* — Fleit Intellectual Property Law; Thomas Grzesik

(57) ABSTRACT

A service running on a server includes a method running on a server, for example as a cloud server to provide a decentralized computing solution. The solution includes an audit service, a tax service or a combination thereof. The service includes providing a distributed registry that specifies a plurality of services available to support communications between a user device and a computer related device on a communication network. The pluralities of services specified by the distributed registry are presented to the user device. A request is received from the user device for a particular service from the plurality of services. The request may be made using a zero-knowledge protocol to maintain (Continued)

privacy of a user of the user device. The particular service includes an additional requested service for at least one of an auditability and taxability service. The particular service is provided along with the additional requested service.

20 Claims, 8 Drawing Sheets

(51) Int. Cl.
    *H04L 67/10*     (2022.01)
    *H04L 67/56*     (2022.01)
    *G06Q 20/00*     (2012.01)
    *G06Q 20/06*     (2012.01)
    *H04L 67/564*     (2022.01)

(52) U.S. Cl.
    CPC .............. *H04L 67/10* (2013.01); *H04L 67/53* (2022.05); *H04L 67/564* (2022.05); *G06Q 2220/00* (2013.01)

(56) References Cited

U.S. PATENT DOCUMENTS

| | | | | |
|---|---|---|---|---|
| 6,675,225 | B1* | 1/2004 | Genty | H04L 12/4641 709/239 |
| 9,036,504 | B1* | 5/2015 | Miller | H04L 45/586 370/254 |
| 9,419,842 | B1* | 8/2016 | Galliher, III | H04L 29/06 |
| 9,430,295 | B1* | 8/2016 | Eizadi | H04L 63/00 |
| 2011/0231840 | A1* | 9/2011 | Burch | G06F 21/53 718/1 |
| 2013/0073703 | A1* | 3/2013 | Das | H04L 67/306 709/223 |
| 2013/0298183 | A1* | 11/2013 | McGrath | G06F 9/455 726/1 |
| 2015/0188949 | A1* | 7/2015 | Mahaffey | H04L 63/20 726/1 |
| 2015/0207813 | A1* | 7/2015 | Reybok | H04L 63/145 726/22 |
| 2016/0080213 | A1* | 3/2016 | Brandwine | H04L 45/586 709/223 |
| 2016/0162882 | A1* | 6/2016 | McClung, III | G06Q 20/352 705/41 |
| 2016/0162897 | A1* | 6/2016 | Feeney | H04L 9/3247 705/71 |
| 2016/0212012 | A1* | 7/2016 | Young | H04L 41/14 |
| 2016/0241604 | A1* | 8/2016 | Klein | H04L 65/1069 |
| 2016/0330034 | A1* | 11/2016 | Back | G06Q 20/065 |
| 2018/0101842 | A1* | 4/2018 | Ventura | H04L 9/0841 |

OTHER PUBLICATIONS

U.S. Appl. No. 14/752,230, filed Jun. 26, 2015, IBM.
U.S. Appl. No. 14/858,389, filed Sep. 18, 2015, IBM.

* cited by examiner

DECENTRALIZED COMPUTING WITH AUDITABILITY AND TAXABILITY

BACKGROUND

The present invention generally relates to services, and more particularly for in particular, to a decentralized computing service with security maximization with tax and/or auditing as part of the service.

Cyber hacking is a widely known and prevalent problem. Many schemes have been tried to prevent or ameliorate the problem. These normally revolve around authenticating a user or building a firewall or setting permissions. These defensive measures have been useful but are limited.

Further, in a decentralized and optionally anonymous ecosystem of cloud services, there is no ability to audit services for the purposes of accounting, law enforcement, troubleshooting, performance tracking, or automated management. Likewise, there is no obvious way to withhold or remit taxes for goods and services in accordance with any local law that requires such taxes.

SUMMARY

One embodiment of decentralized computing service with at least one or an audit service, a tax service or a combination thereof. The solution includes providing a distributed registry that specifies a plurality of services available to support communications between a user device and a computer related device on a communication network. The pluralities of services specified by the distributed registry are presented to the user device. A request is received from the user device for a particular service from the plurality of services. The request may be made using a zero-knowledge protocol to maintain privacy of a user of the user device. The particular service includes an additional requested service for at least one of an auditability and taxability service. The particular service is provided along with the additional requested service.

In one example, the service further includes metadata describing a current cryptocurrency cost of each of the plurality of services is appended to a descriptor of the each of the plurality of services. The payment is received for services offered through a distributed registry associated with the communication network.

Other embodiments of the invention include a system and a computer program product.

These and other features and advantages will become apparent from the following detailed description of illustrative embodiments thereof, which is to be read in connection with the accompanying drawings. trading outcomes of events is a computer-implemented method.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
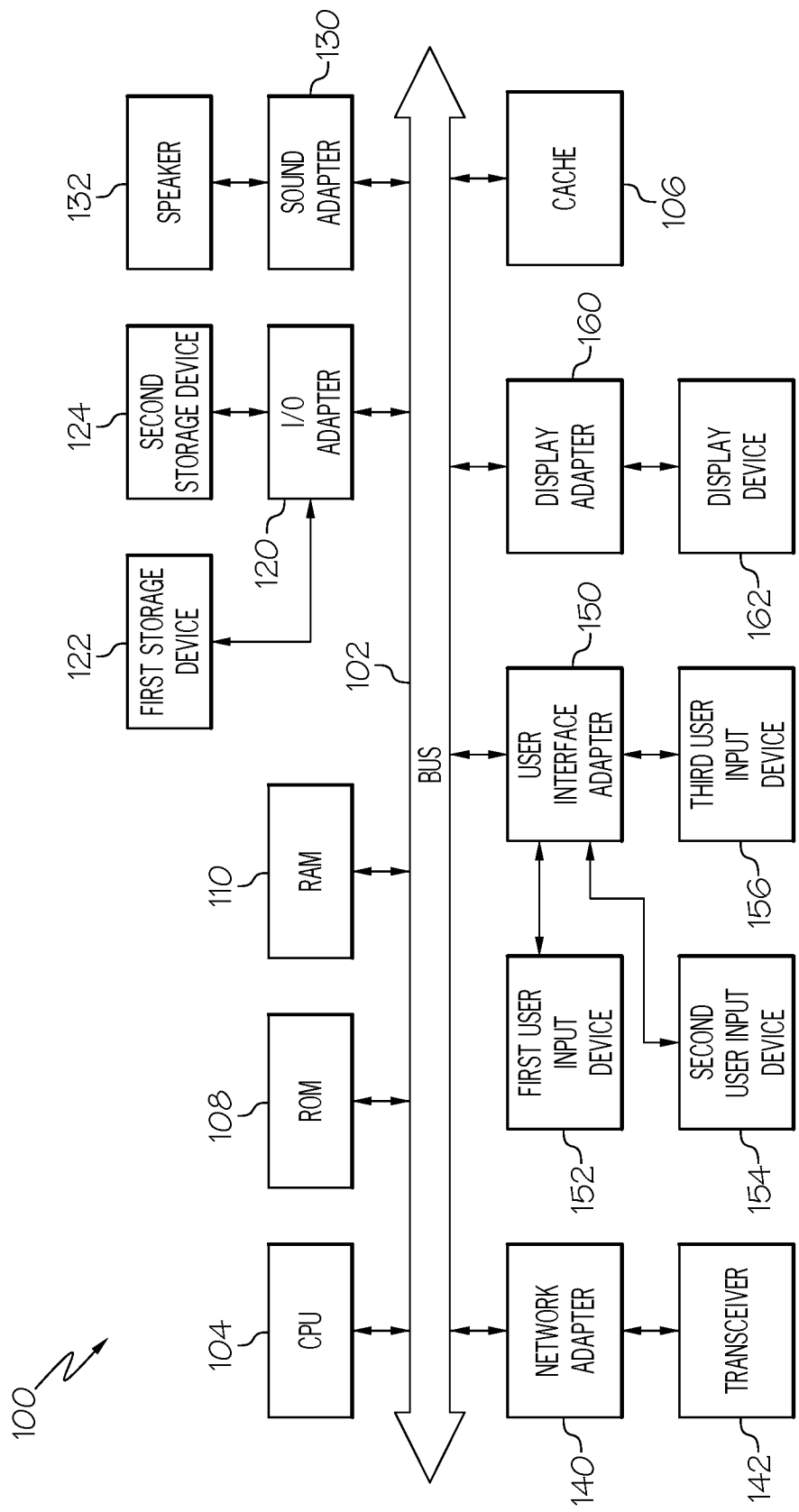
FIG. 1 shows a processing system 100 to which the present invention maybe applied, in accordance with an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention is directed to security maximization for a computer related device based on real-time reaction with audibility and taxation. In particular, the security maximization is provided between a user device and the computer related device. The computer related device can be a computer or computer system of any form (e.g., including, but not limited to computer-based transaction systems, and so forth) or a device related to a computer or computer system (e.g., any peripheral including, but not limited to, a router, a modem, a database, a printer, a scanner, a biometric device, an input device, and so forth). The present invention is also applicable to machine to machine security maximization.

In one embodiment, the present invention relate to an application of the Distributed Autonomous Corporation (DAC) concept to general-purpose cloud computing, including one way or two-way anonymization using one or more proxies similarly to Tor or I2P. The integrated anonymization function can have one or multiple layers of anonymization. By implementing a distributed cloud computing infrastructure as a DAC with robust integrated anonymity for both service requesters and service providers an assurance of privacy is provided that is impossible to obtain in current cloud computing systems.

In another embodiment, the present invention provide a system and method that are highly responsive and resistive to probabilistic threat levels in a highly variable manner based on risk value.

In another embodiment, the present invention maximize the security for a computer related device based on real-time reaction to a dynamically computed probabilistic threat security assessment utilizing multi-layered virtual machine engines that are dynamically configured into a highly dynamic, occulted, topology of processing lanes.

In another embodiment, the present invention can reduce the probability of a successful attack on a computer related device using a real-time risk sensitive system that dynamically alters a multi-node processing pathway between the user and the computer related device. The nodes are composed of virtual machines (VMs) in a highly variable topology. These virtual machines must be addressed in the proper sequence, at the proper address, using the correct encryption code and during the right time window (when the relevant nodes are active). Normally only the entrance VM is in existence and visible. The other nodes are instantiated only as needed by an out-of-plane control node. Depending upon the risk level, different processing lanes are constructed for each function required to interact with data (e.g., functions including, but not limited to, issuing a command, viewing a return set, and so forth). The topology of the lanes and nodes is re-phased on a quasi-random scheme. This mechanism is highly resistant to picking because of the defense in depth that requires multiple dimensions of precision to successfully interact with the transaction system or the data. Getting anything in the wrong order, or at the wrong address or with the wrong key will be totally successful in preventing an attack. Moreover, any partial pick will provide no advantage for a future attack.

One or more embodiments of the present invention provide robust auditability and taxation where needed and applicable. For example, a provider of Cloud services may wish to advertise a guarantee of service level availability. If after activating and taking payment for a service for an anonymous customer, the cloud node performing the service may have a failure resulting in loss of service to the customer. A record of transaction details including the lack of a successful program exit is stored in encrypted form in a mutually accessible place with the key divided between the parties.

Storage: The audit records may be stored in any convenient mutually accessible place including:
- A transaction record on a blockchain, if the record is concise and it is desirable for the record to exist in perpetuity.
- A transaction record on a Storage Cloud service such as Amazon S3 or Dropbox, for larger records and in cases where expiration and deletion is desirable.

The access key may be:
- A shared secret between the two parties
- A shared secret between the original two parties and one or more third party services: auditors, service management and monitoring processes, accounting processes or services, government and tax revenue monitors, service arbiters and guarantors, and many others.
- A key divided up among the two or more of the parties described above, where the key can be reconstituted by all or a certain fraction of the parties in cooperation.

In one embodiment of the services described above takes the form of a minimal elemental provable zero-knowledge service using Probabilistically Checkable Proofs (PCPs), Zero-Knowledge Succinct Arguments of Knowledge (zkSNARKS), Succinct Computational Integrity and Privacy, or any similar cryptographic method of verifiable computation capable of operating in zero-knowledge.

In another embodiment a verifiable ZK transaction-refund service is provided by the original service provider, or by a third party guarantor of service.

Both the auditing and the taxation services are advertised either as separate optional services or as inherent service attributes in the registry of cloud services for example using the peer-to-peer distributed registry described in U.S. application Ser. No. 14/752,230, filed on Jun. 26, 2015, and U.S. application Ser. No. 14/858,389, filed on Sep. 18, 2015, the teachings of each are hereby incorporated by reference in their entirety. Verifiable attribution of the service provider or taxing organization can be included through known techniques using Public Key Infrastructure, for example by signing an element of the service using certificates held by the known public entity that provides the service such as third-party guarantors or government tax agencies.

The taxation service adds tax information to the original service advertisement on the registry, including the specific government body to which the tax is to be remitted, and the rate at which the tax is to be assessed on the goods and services provided.

In another embodiment the taxation services assesses the tax at the highest applicable rate for the taxing body or bodies that apply based on the local law for the region in which the service is provided or procured. The tax is automatically remitted to a publicly advertised cryptocurrency wallet (or similar function) on successful program exit or on remission of payment for the goods and services conveyed. A record of the tax remission is recorded by the auditing service as described above. This allows both parties to remain anonymous unless audited/investigated by the government (e.g. the taxing body or law enforcement), in which case the audit record key is retrieved or reconstituted between the parties, and their identities revealed to the taxing body that initiated the audit. At this point, assuming the parties are fully honest, the customer has the option to have the tax reassessed at the presumably lower rate based on full knowledge of the transaction in the audit record. This motivates the government bodies not to assess widespread audits due to the expected loss in revenue—the government is motivated to audit only those transactions which they have good reason to believe are fraudulent or otherwise illegal.

Non-Limiting Definitions

The terms "a", "an" and "the" are intended to include the plural forms as well, unless the context clearly indicates otherwise.

The term "audit" means an official inspection of a person or organization's account. This is typically performed by an independent third party such as an account, consultant, or attorney.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "cryptocurrency" is used to mean a medium of exchange using cryptography to secure the transactions and to control the creation of new units. Cryptocurrencies are a subset of alternative currencies, or specifically of digital currencies. Bitcoin is an example.

The term "distributed registry" means a distributed database, typically implemented using a form of a distributed hash table. One example includes a "blockchain" is a distributed database that keeps a continuously growing list of data records. Each data record is protected against tampering and revisions. Blockchains are used with public ledgers of transactions, where the record is enforced cryptographically.

The term "tax" means a fee levied by a county, state, or Federal government on a good, income, service, or activity of persons, groups or business within the jurisdiction of that government.

The phrase "verifiable computing" in cryptography, is a method by which one party, the prover can prove to another party (also referred to herein as a "user"), the verifier that a program has been or is being executed correctly and without modification or tampering.

A "zero-knowledge protocol", in cryptography, is a method by which one party, the prover, (also referred to herein as a "user", can prove to another party, the verifier (also referred to herein as a "service provider") providing a service that a given statement is true, without conveying any information apart from the fact that the statement is indeed true.

The phrase "zero-knowledge verifiable computing" is a method of verifiable computing whereby a program is specially compiled to perform a function and produce a result while simultaneously computing and providing a cryptographic proof that it executed correctly in untampered-with form. The computed proof can be probabilistically checked to verify the integrity of the computation, to varying levels of assurance depending on how many bits of the proof the checker chooses to verify. This method is known in the art as a Probabilistically Checkable Proof (PCP) and may take several forms, including interactive proof during the execution of the program and non-interactive proof at the completion of the program execution. The phrase "zero-knowledge verifiable computing" is a method of verifiable computing which can also provide the proof of integrity through a zero-knowledge protocol. This combination of Verifiable Computing with a Zero-Knowledge protocol, often also using a succinct method such as Succinct Computational Integrity and Privacy (SCIP) and zero-knowledge Succinct Non-Interactive Arguments of Knowledge (zkSNARK) techniques, combining the advantages of verifiability, succinctness, and zero-knowledge operation to maximize assurance of both integrity and privacy while minimizing computational cost.

Processing System

FIG. 1 shows a processing system 100 to which the present invention maybe applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to A system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the scope of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Management Node for Distributed Registry

Figure 2:
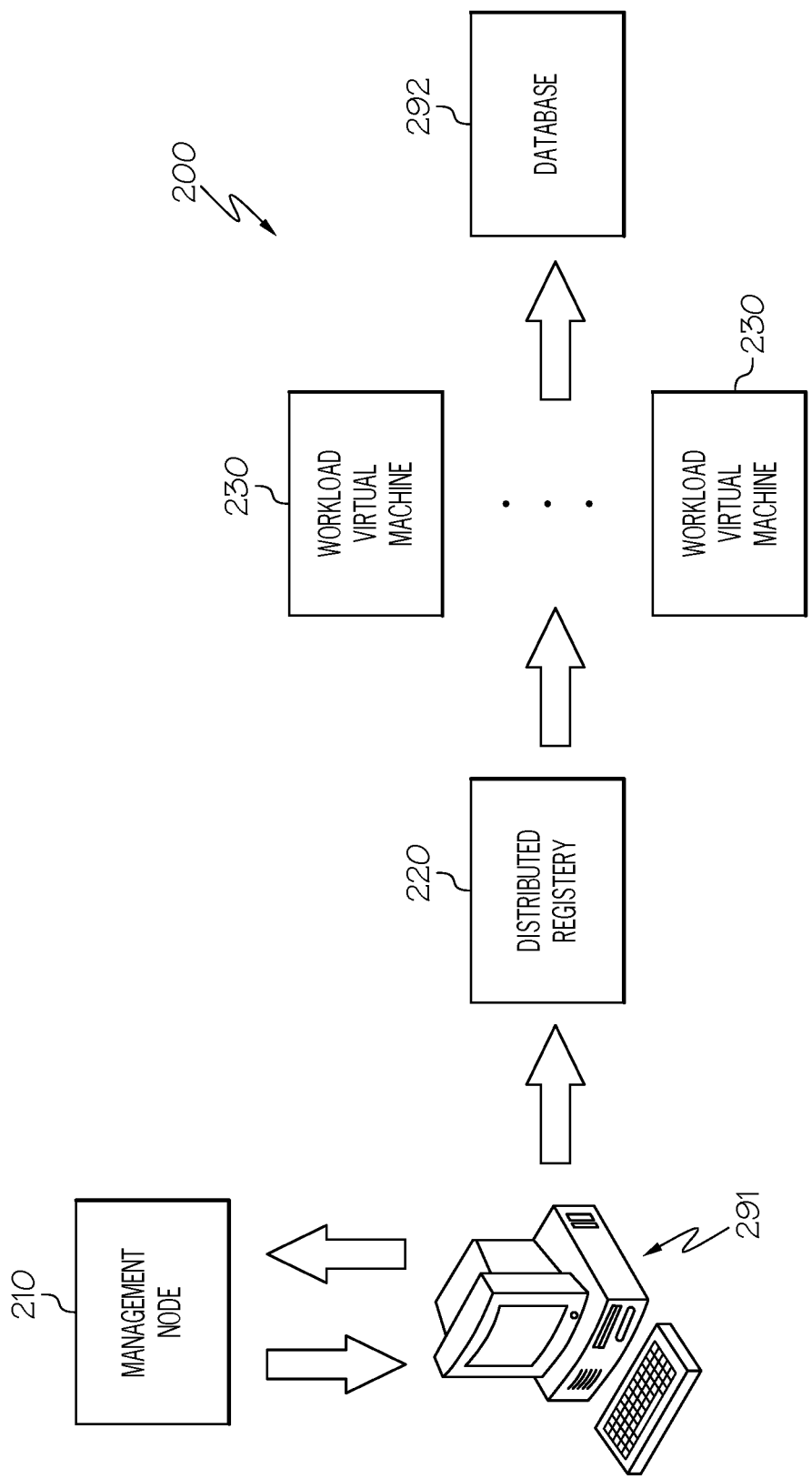
FIG. 2 shows a system 200 for security maximization for a computer related device with tax and/or auditing as part of a service, in accordance with an embodiment of the present invention.
Figure 3:
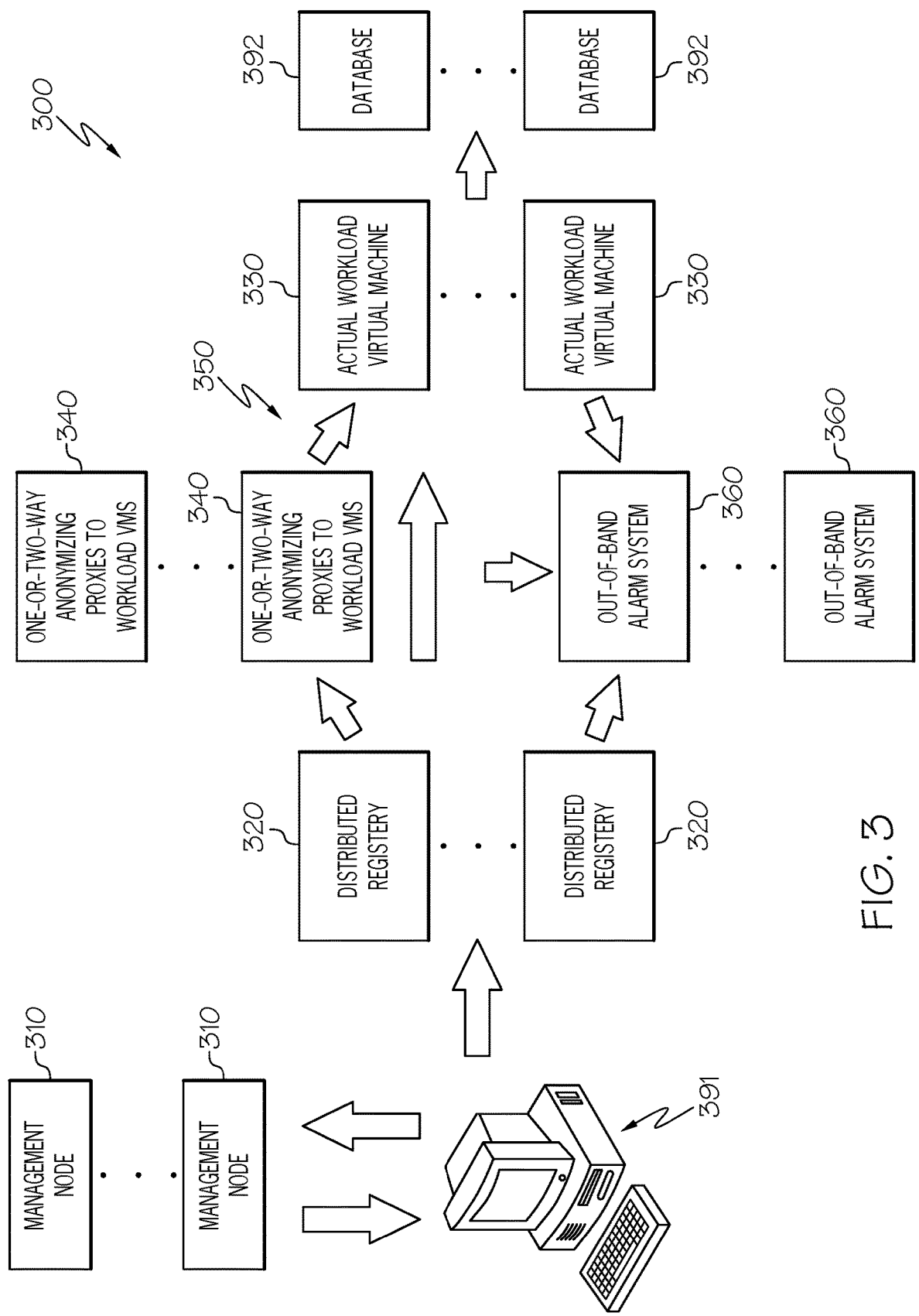
FIG. 3 shows another exemplary system 300 for security maximization for a computer related device with tax and/or auditing as part of a service, in accordance with an embodiment of the present invention.

Moreover, it is to be appreciated that systems 200 and 300 described below with respect to FIG. 2 and FIG. 3 are systems for implementing respective embodiments of the present principles. Part or all of processing system 100 may be implemented in one or more of the elements of system 200 and/or in one or more of the elements of system 300.

Figure 4:
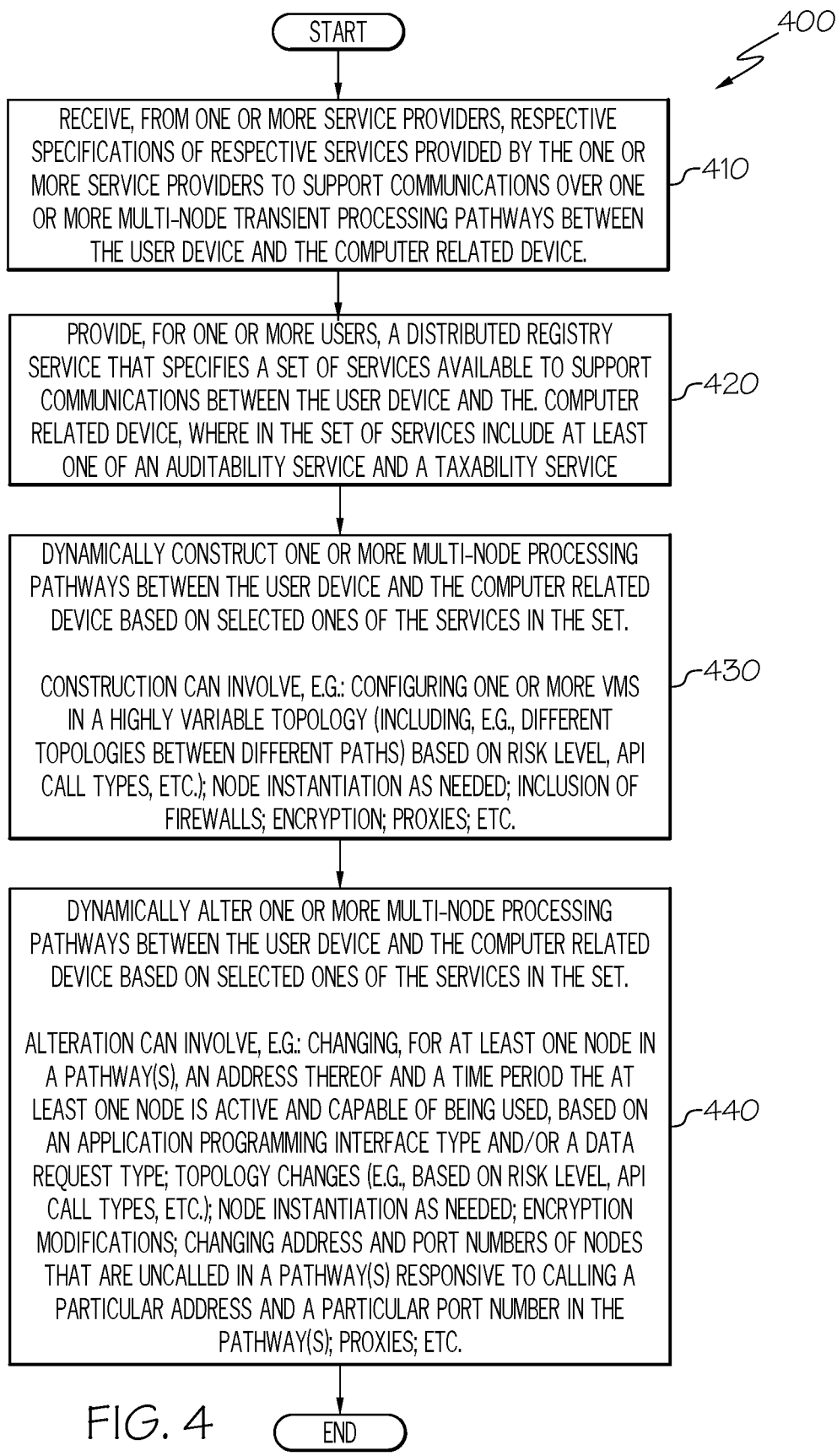
FIG. 4 shows an exemplary method 400 for security maximization for a computer related device with tax and/or auditing as part of a service, in accordance with an embodiment of the present invention.

Further, it is to be appreciated that processing system 100 may perform at least part of the method described herein including, for example, at least part of method 400 of FIG. 4. Similarly, part or all of system 200 and/or part or all of system 300 may be used to perform at least part of method 400 of FIG. 4.

It is to be appreciated that there can be some overlap between the elements of system 200 and system 300. As such, descriptions of various aspects of various elements of one system while not explicitly mentioned with respect to the other system for the sake of brevity, can also apply to various aspects of various elements of the other system while maintaining the spirit of the present invention.

FIG. 2 shows an exemplary system 200 for security maximization for a computer related device with tax and/or auditing as part of a service, in accordance with an embodiment of the present invention.

For illustrative purposes, the example of FIG. 2 can be considered to apply and/or otherwise represent a secure work location at predicted hours. Of course, the present invention in general and system 200 in particular can be applied to other situations while maintaining the spirit of the present invention.

The system 200 is used to maximize the security between a user workstation 291 and a database 292. The user workstation 291 hosts browser sessions sent back by each function in a chain of functions.

The system 200 includes and/or otherwise involves a management node 210, a distributed registry 220, and a set of workload virtual machines (VMs) 230. While the embodiment of FIG. 2 includes only one each of the preceding elements 210 and 220, it is to be appreciated that other embodiments of the present invention can include more than one of any of the preceding elements 210 and 220.

The management node 210 specifies one or more processing paths based on risk. In an embodiment, the management node 210 configures the set of VMs 230 to form one or more multi-node processing paths (lanes) based on risk. Further details regarding the configuring of the set of VMs is described below.

The management node 210 also performs risk assessment where, as noted above, such risk assessment is used to specify one or more processing paths. This risk assessment is described in further detail herein below.

The distributed registry 220 includes encrypted and/or algorithmically occluded pointers to the set of workload VMs 230. In an embodiment, the distributed registry 220 can be implemented as a distributed hash table. Other forms are also possible for the distributed registry 220, while maintaining the spirit of the present invention.

The set of workload VMs 230 form the nodes of a multi-node processing pathway(s) between the user workstation 291 and the database 292. In an embodiment, one or more of the workload VMs 230 form a respective node of a respective multi-node processing pathway. The VMs 230 are described in further detail herein below.

FIG. 3 shows another exemplary system 300 for security maximization for a computer related device with tax and/or auditing as part of a service, in accordance with an embodiment of the present invention.

For illustrative purposes, the example of FIG. 3 can be considered to apply and/or otherwise represent a problematic location in a problematic country outside of predicted hours. Thus, the example of FIG. 3 can also be considered to represent a highly insecure example, in contrast to the example of FIG. 2 which is presumably somewhat more secure. Of course, the present invention in general and system 300 in particular can be applied to other situations while maintaining the spirit of the present invention.

The system 300 is used to maximize the security between a user workstation 391 and a distributed database 392. The user workstation 391 hosts browser sessions sent back by each function in a chain of functions. The distributed database 392 represents a set of services that can include, but are not limited to, relational or no SQL database services and/or other storage and/or state maintenance functions, and which overlap with the workload virtual machines 330.

The system 300 includes and/or otherwise involves a set of management nodes 310, a set of distributed registries 320, a set of workload virtual machines 330, a set of one-way or two-way anonymizing proxies to workload VMs 340, multiple layers of indirection 350, and a set of out-of-band alarm and control systems 360.

The set of management nodes 310 specifies one or more processing paths based on risk. In an embodiment, the set of management nodes 310 configure the set of VMs 330 and the set of one-way or two-way anonymizing proxies to workload VMs 340 to form one or more multi-node processing paths (lanes) based on risk. Further details regarding the configuring of the set of VMs is described below.

The set of management nodes 310 also perform risk assessment where, as noted above, such risk assessment is used to specify one or more processing paths. This risk assessment is described in further detail herein below.

In an embodiment, the set of management nodes 310 are implemented as a distributed set.

The set of distributed registries 320 include encrypted and/or algorithmically occluded pointers. For example, in an embodiment, the set of distributed registries 320 can be based on a cryptographic block chain, as various cryptocurrencies are today. In an embodiment, one or more of the distributed registries in the set can be implemented as a distributed hash table. Other forms are also possible for any of the distributed registries 320, while maintaining the spirit of the present invention.

Once the set of management nodes 310 is established, their primary function is to establish a globally distributed service registry. Any nodes attaching to the network may advertise a service, and the availability of this service is advertised to the rest of the network. In an embodiment, the service availability is advertised in a similar way to the BitTorrent network propagating the availability of a file. In an embodiment, services are standardized using a system of common service codes; version numbers can be standardized, and management nodes can opt not to accept unknown service codes or service codes below a version number. The registry service itself may also be advertised between nodes with a version number, subject to these same optional limitations.

A distributed registry service, operated across the distributed network of management nodes, is the function that enables the proxy service, the various hosting services for workload virtual machines, and the database services to be advertised to anyone attaching to the network. Anyone connecting to the network via a management mode can advertise a service or request a service of a node that has advertised one.

Service advertisements, requests for service, and completed transactions can optionally be logged as a transaction in the distributed registry or transaction log. Further any entity or party requesting information, such as, an audit or tax information, can be a third party which is different than the party requesting the set of services.

The set of workload VMs 330 form at least some of the nodes of a multi-node processing pathway(s) between the user workstation 391 and the database 392. In an embodiment, one or more of the workload VMs 330 form a respective node of a respective multi-node processing pathway. The VMs 330 are described in further detail herein below.

The one-way or two-way anonymizing proxies to workload VMs 340 provide one-way or two-way anonymity regarding communications between the user workstation 391 and a distributed database 392.

The one-way or two-way anonymizing proxies to workload VMs 340 provide a second general service, which is advertised on the distributed registry and propagated through the network composed of management nodes as a proxy service for the purpose of anonymization. In an embodiment, this service can be implemented to be directly comparable to Tor and I2P and can optionally make use of these existing networks. However, the proxy service is intended to allow one way or two-way anonymity and is integrated with the registry service such that all services may be registered either anonymously or in the clear or both. Likewise, all services maybe requested and transactions brokered through the network either anonymously or in the clear. Finally, all advertisements, requests, and transactions may be required to go through one or more layers of anonymization for greater privacy and security.

The multiple layers of indirection 350 can be used when routing communications between the user workstation 391, the workload VMs 330, and the distributed database 392 through the set of one-way or two-way anonymizing proxies to workload VMs 340. In this way, subsequent hops through the nodes are made difficult to predict.

The set of out-of-band alarm and control systems 360 provide additional security for the communications between the user workstation 391, actual workload virtual machine 330, and distributed database 392.

In order to provide security for the control of virtual machines being run on actual hardware, all control signals and system commands can use cryptography to prevent their interception by outsiders. Additionally using a separate communications network for the commands separate from anonymized communication flows (as per the one-way or two-way anonymizing proxies to workload VMs 340) will make interception and decryption significantly more difficult. All control, allocation, de-allocation, movement of running virtual machines, and security messages will be sent to different IP addresses, well-known port numbers, utilizing encrypted communications. The present invention is not limited to any particular encryption technology or protocol. Thus, any encryption technology and protocol as applicable can be used in accordance with the teachings of the present invention, while maintaining the spirit of the present invention. By utilizing different and shifting IP addresses, independent of communications related to the distributed workload, determinations of which message went to which actual physical hardware will increase the difficulty of interception many fold. It is also possible to provide an independent communications network for out-of-band control communications. This could include, for example, but is not limited to, physical communication means such as light fiber, a local area network not connected to the Internet, or physical traces on motherboards.

If penetration attempts are detected, the control system can order the anonymizing proxies to issue all new communications to altered IP addresses and well-known port numbers. Ideally, the out-of-band alarm and control system 360 would run on different hardware than the anonymizing proxies 340. Upon receiving notifications from the out-of-band alarm and control system 360 that penetration attempts have been detected, commands will be sent to anonymizing proxies 340 with new IP addresses and well-known port numbers generated by the out-of-band alarm and control system 360. The anonymizing proxies 340 will not be informed why addresses are being changed, only that they must to do so immediately. Detection of penetration attempts may be determined by out of band alarm and control systems or other external security or network monitoring programs.

Out-of-band alarm and control system 360 will only know virtual IP addresses and not physical IP addresses. This has two major advantages. One advantage is that it eases the difficulties of configuring a zero knowledge network. Another advantage is that it provides a level of security when actual physical IP addresses are not known by the anonymizing proxies 340 nor the out-of-band alarm and control system 360.

Process Flow

FIG. 4 shows an exemplary method 400 for security maximization for a computer related device with tax and/or auditing as part of a service, in accordance with an embodiment of the present invention.

At step 410, receive, from one or more service providers, respective specifications of respective services provided by the one or more service providers to support communications over one or more multi-node transient processing pathways between the user device and the computer related device. The services can include, but are not limited to, one-way and/or two way anonymizing proxy services, indirection services, workload virtual machines services, out-of-band control communication services, and so forth.

At step 420, provide, for one or more users, a distributed registry service that specifies a set of services available to support communications between the user device and the computer related device. The set of services includes an additional requested service for an auditability service, a taxability service, or a combination of both. The set of services can include one or more services whose respective specifications were received in step 410 including the auditability service and/or the taxability service. In an embodiment, the set of services or a selection of at least some of the services can be determined based on, for example, a probabilistic threat assessment of potential threats against the computer related device. In an embodiment, the probabilistic threat assessment indicates a respective threat level.

At step 430, dynamically construct one or more multi-node processing pathways between the user device and the computer related device based on selected ones of the services in the set. For example, a user may select various services from the set of services based on the user's needs, an expected threat, and so forth.

In an embodiment, each of the one or more multi-node processing pathways includes a beginning node, an end node, and a set of intervening nodes. In an embodiment, at least the set of intervening nodes are instantiated on demand by an out-of-plane control node (e.g., a management node) and, thus, may last for varying lengths of time. In an embodiment, only the beginning node is normally in existence and externally visible.

The nodes of each of the one or more processing paths are configured to have a highly variable topology, and must be addressed in the proper sequence, at the proper address, using the correct encryption code, and during the right time window (when the relevant nodes are active). In an embodiment, the topology of the nodes and the corresponding processing paths that they form are re-phased on a quasi-random scheme. In an embodiment, each node of the one or more multi-node processing pathways includes a portion for receiving directions from a user or preceding nodes or an out-of-band alarm and control system, a firewall portion, and at least one portion for directing subsequent nodes and/or actions.

In an embodiment, the one or more multi-node processing pathways are constructed to include one or more sets of virtual machines (e.g., workload VMs and/or one-or-two-way anonymizing proxies to workload VMs) with a variable topology.

In an embodiment, step 430 can involve constructing a respective multi-node processing pathway for each respective function from a set of functions required to interact with data, based on a risk level indicated by the probabilistic threat assessment.

In an embodiment, each of the one or more multi-node processing pathways is constructed to have a different topology that is based on which of a plurality of different types of application programming interface calls are invoked for a current session between the user device and the computer related device.

In an embodiment, proxies can be used in the one or more multi-node processing pathways.

At step 440, dynamically alter one or more multi-node processing pathways between the user device and the computer related device based on selected ones of the services in the set. In an embodiment, step 440 can involve changing, for at least one node in a processing pathway(s), an address (e.g., an Internet Protocol (IP) address and/or a media access control (MAC) address) thereof and a time period the at least one node is active and capable of being used, based on an application programming interface type and/or a data request type (e.g., implicated by a received packet).

In an embodiment, each of the one or more multi-node processing pathways is altered more frequently based on increasing threat level and is altered less frequently based on decreasing threat level. In an embodiment, a node topology of each of the one or more multinode processing pathways is re-phased on a quasi-random scheme.

In an embodiment, step 440 can involve changing address and port numbers of nodes that are uncalled in at least a given one of the one or more multi-node processing pathways in response to calling a particular address and a particular port number in the given one of the one or more multi-node processing pathways.

In an embodiment, each of the one or more multi-node processing pathways is altered to have a different topology that is based on which of a plurality of different types of application programming interface calls are invoked for a current session between the user device and the computer related device.

In an embodiment, multiple layers of indirection can be implemented in the communications between the user workstation and the distributed database.

In an embodiment, encryption keys and/or types of encryption keys can be varied for one or more of the nodes in the one or more multi-node processing pathways.

In an embodiment, proxies can be used in the one or more multi-node processing pathways.

A description will now be given regarding various advantages and exemplary implementations of the present invention.

Advantageously, the present invention dynamically provide the necessary level of security based on probabilistic risks and processing activity. The response level consumes resources in an optimized manner proportional to the threat(s). Above the lowest level of threat, the topology of the system is highly dynamic and highly variable with an ultra-low level of repeated patterning. In an embodiment, a low threat environment can have a logical path of, for example, two nodes. In an embodiment, a high level threat can have a path of, for example, twenty or more nodes with only one visible known point (node). It is to be appreciated that the preceding numbers of nodes are merely illustrative and, thus, other numbers of nodes may be used in accordance with the teachings of the present invention, while maintaining the spirit of the present invention. In an embodiment, processing paths expand on a horizontal plane (conceptually) according to plans that are spread across multiple platforms, at multiple different addresses, for variable lengths of time.

In an embodiment, the present invention can provide a unique topology of changing IP addresses and port numbers for each different type of application programming interface (API) call and data request. When a new IP packet arrives at a correct IP address, the packet is analyzed to determine what API call, database request, analytic algorithm, source data systems to fulfill a federated database query, or executable program is being requested. Guessing IP addresses and port numbers would be insufficient to hack into the protected device or communication between the user and the protected device. Also, calling one of the specific IP address and port numbers would cause all the other IP addresses and port numbers, which were not called, to also change. By adding a topology for each type of call, the present invention advantageously provide a significant advancement over the current state of the art.

A description will now be given regarding defining a threat level, in accordance with an embodiment of the present invention.

The threat level is determined based on, for example, an N dimensional, nonlinear threat matrix. Factors can include, but are not limited to, one or more the following: CRUD activity (Create, Read, Update, Delete); volume; element/transaction sensitivity; known secure location versus known insecure location; are you where your calendar says you will be (e.g., agreement there between lowers the risk level, while disagreement there between raises the risk level); personal/cohort known pattern agreement; and so forth. It is to be appreciated that the preceding factors for determining threat level are merely illustrative and, thus, other factors can also be used in accordance with the teachings of the present invention, while maintaining the spirit of the present invention. Moreover, the following characteristics relating to threat level are also illustrative and, thus, other characteristics can also be used in accordance with the teachings of the present invention, while maintaining the spirit of the present invention.

In an embodiment, the threat level can be implemented as a nonlinear function of the various threats versus the activities involved.

The threat level can be symmetrical or asymmetrical. As an example, the threat level can be kept at a higher level once a high level is achieved and can be ratcheted back slowly thereafter.

In an embodiment, the threat level can be tracked temporally across multiple sessions and periods of time.

A description will now be given regarding several aspects of the present invention, in accordance with an embodiment of the present invention.

In an embodiment, the user is separated from any direct interaction with data/transaction system.

In an embodiment, the connection between the user and a computer related device is made through one or more multi-node processing pathways made of multiple layers of VM machines. In an embodiment, the VM machines come into existence only when correctly summoned and may last for varying lengths of time. In an embodiment, the placement topology of the VM machines is highly variable. In an embodiment, the placement of the machines is always occulted from the user and external visibility.

In an embodiment, each node of a multi-node processing pathway has a section to receive direction from the user or preceding nodes, a firewall section, and a section to direct subsequent nodes or actions.

In an embodiment, all communications, at all stages, are encrypted with multiple types of encrypted keys and may be rotated during sessions and be different from node to node.

A description will now be given regarding why the system and method provided in accordance with the present invention is essentially impervious to attacks.

To successfully beat the system, an attacker must successfully predict/crack the following: Internet Protocol (IP) address and the time the node is active (noting that active nodes appear and disappear); the number of nodes in the topology (which include a beginning node, a variable number of middle nodes, and end node); the locations of nodes; the encrypted keys of the nodes; the sequence of actions; and the timing of nodes being created and destroyed in the processing quantum form.

Thus, the system described above enables services to be offered and procured anonymously through a distributed peer to peer registry and optional one- and two-way anonymizing proxies. In order to pay for such services privately (and/or anomalously), in one or more embodiments of the present invention the system advertises (presents) through the distributed registry metadata indicating a cost in cryptocurrency for the services. This cryptocurrency is negotiated through an automated, anonymous mechanism and changes hands automatically.

A cryptocurrency is defined as a medium of exchange using cryptography to secure the transactions and to control the creation of new units of cryptocurrency. That is, cryptocurrency is a cyber-currency in which a contract is made between parties to set the value of the cryptocurrency, to control the level of cryptocurrency in the system, and to store the cryptocurrency in electronic databases, thus leading to a peer-to-peer system of digital currency. Cryptocurrency has several advantages over conventional currencies.

First, cryptocurrency allows purchases to be made with a certain level of anonymity, thus allowing companies to purchase goods and/or services without alerting competitors of such purchases.

Second, cryptocurrency is accessible to anyone with access to the Internet (e.g., via a smart phone), thus providing banking services to persons in economically undeveloped areas.

As described below, services advertised through the distributed registry described above are tagged with an attribute indicating cost in cryptocurrency.

Units of cost may be, for example, portions of a unit of cryptocurrency for: a unit of computing work done; an amount of storage per unit of time: a specific Software as a Service (SaaS) or Platform as a Service (PaaS) service for a specific completed job or for a unit of time; and/or a one-time brokered transaction such as an anonymized procurement of service over the distributed cloud network. This anonymity allows a company to ensure that services procured and paid for are not publicly disclosed, thereby protecting trade secrets, corporate business strategies, etc. Of course, payment of such services continues to be ultimately disclosed as required by tax and business code regulations. But the services themselves that are procured can remain secret.

Atomicity: Services procured through the distributed may be atomic such that several microtransactions are linked and executed in "all or nothing" form. For example, the procuring end user may choose to procure an offered service through two layers of anonymizing proxies. That is, two anonymizing proxies advertise that they will anonymize a particular SaaS service transaction for 0.00001 of a cryptocurrency unit, and the advertising SaaS service offers its service for 0.010 cryptocurrency unit for a unit of work. The procuring end station may then specify that the three transactions are atomic, sending the transaction through the first proxy and then the second to the SaaS server, with all three transactions executing together.

Provably Unspendable Fees: Services may optionally advertise for a provably unspendable cryptocurrency fee. For example, if a service provider does not desire to profit from the service but wants a mechanism that will prevent denial of service through massive overuse, the provider may require that in order to procure the service, the procuring party must "sacrifice" a certain amount of crpytocurrency.

Contracts, including escrow, mediation, and deposit: A preferred embodiment of the present invention includes the Atomicity feature, and uses Distributed Cryptocurrency Contracts (e.g., cryptocurrency software script) to enable two- or multi-party transactions with minimal need for trust between parties. Additional features of cryptocurrency contracts and scripts can be used to enable deposits to be made beforehand for certain procured services, and for payment to be rendered with untrusted third parties—human or automated—acting as escrow agents and/or dispute mediators.

Cryptocurrency services: A distributed cloud network may optionally be used to provide cryptocurrency-specific services including currency exchange and transaction privacy and/or anonymization services.

Figure 5:
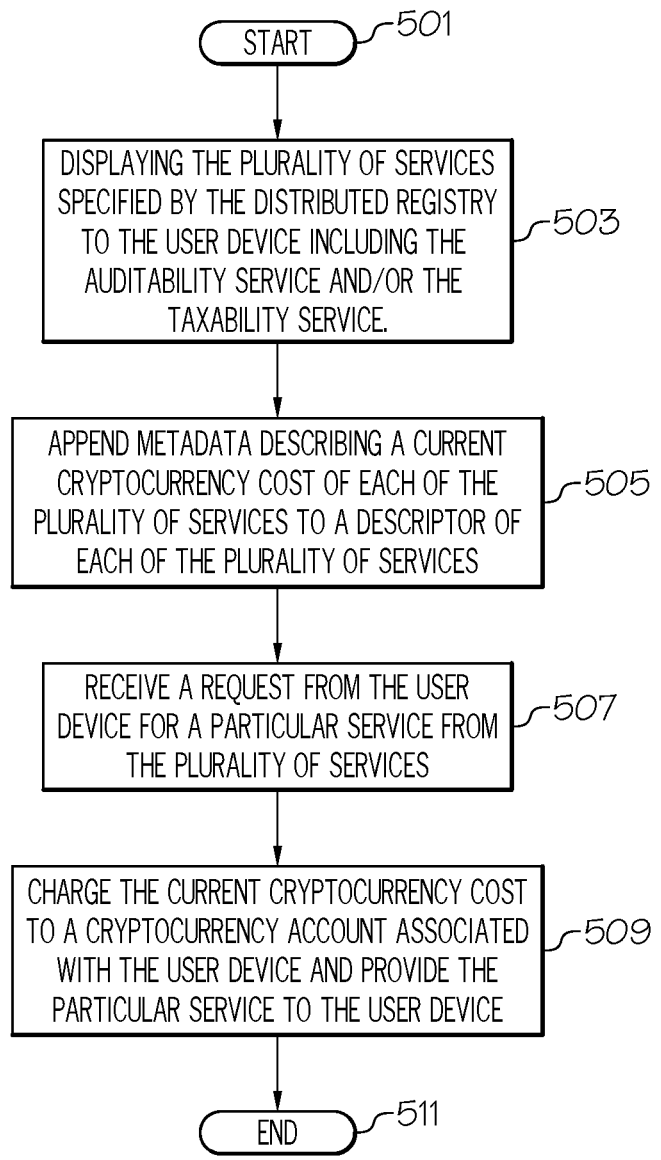
FIG. 5 is a high-level flow chart of one or more steps performed by one or more processors or other hardware devices to receive cryptocurrency payment for services presented by a distributed registry with tax and/or auditing as part of a service, according to an embodiment of the present invention.

Thus, with respect now to FIG. 5, steps performed by one or more processors and/or other hardware devices to receive payment for services provided by the distributed registry is presented with tax and/or auditing as part of a service.

After initiator block 501, one or more processors display the plurality of services specified by the distributed registry (see above) to the user device, as described in block 503 including the auditability and/or the taxability service.

As described in block 505, the processor(s) then append metadata describing a current cryptocurrency cost of each of the plurality of services to said each of the plurality of services. That is, each service is described in a descriptor, and each descriptor has metadata describing a cryptocurrency cost of the service.

As described in block 507, the processors(s) receive a request from the user device for a particular service from the plurality of services.

As described in block 509, in response to receiving a request from the user device for a particular service from the plurality of services, the processor(s) charge the current cryptocurrency cost to a cryptocurrency account associated with the user device and providing the particular service to the user device.

The flow-chart ends at terminator block 511.

Thus, the process depicted in FIG. 5 allows a user to anonymously pay for services presented in the distributed registry described above.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention is capable of being implemented in conjunction with any other type of computing environment now known or later developed.

Generalized Computing Environment

Figure 6:
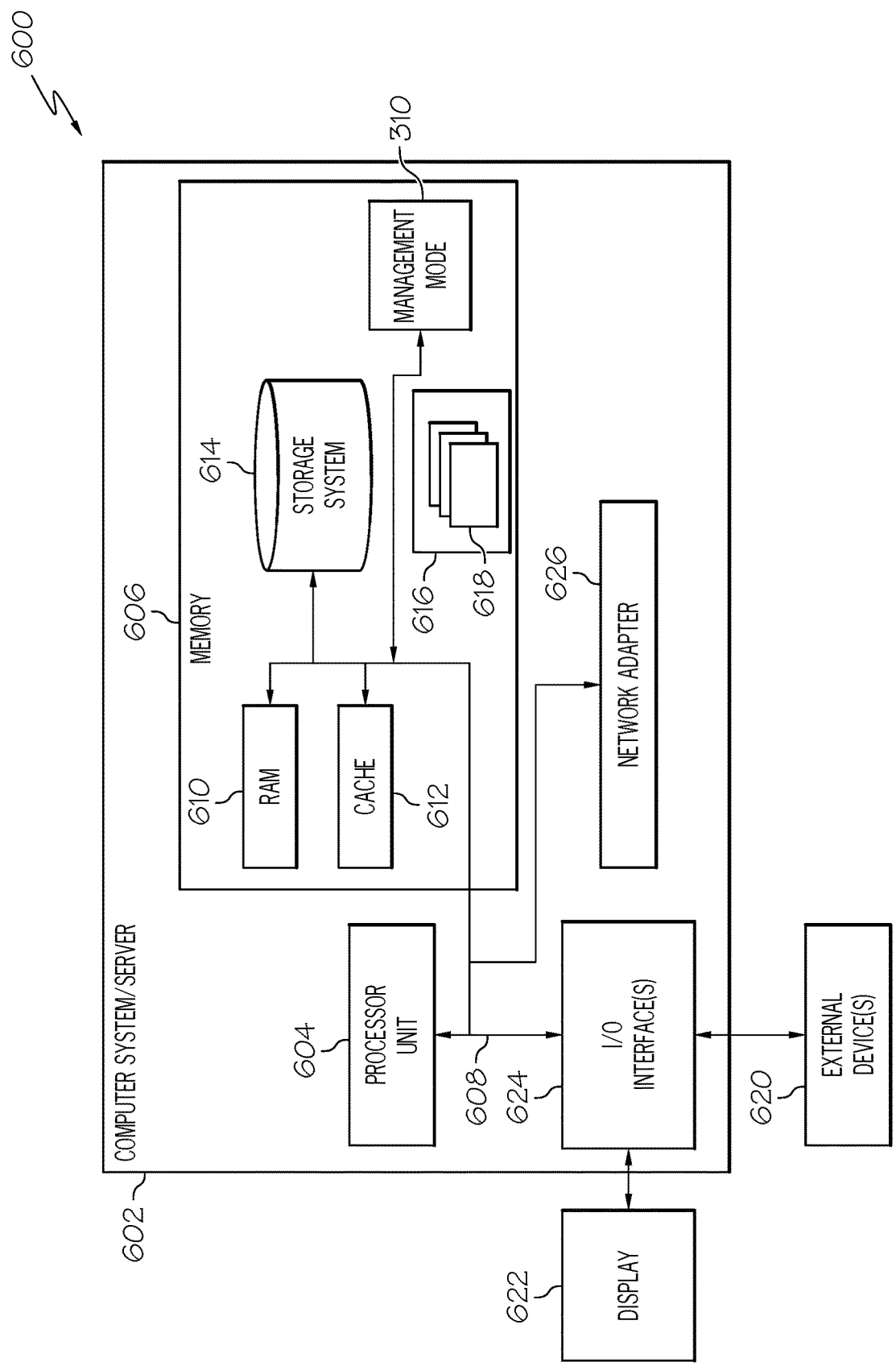
FIG. 6 depicts a cloud computing node according to an embodiment of the present invention.

FIG. 6 illustrates one example of a processing node 600 for operating the zero-knowledge verifiable computing platform of FIG. 1 through and FIG. 3, in accordance with an embodiment the present invention. This example is not intended to suggest any limitation as to the scope of use or functionality of embodiments of the invention described herein and the processing node 600 is capable of being implemented and/or performing any one or more of the functionalities set forth herein.

As depicted, processing node 600 can be a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules as further described below, being executed by a computer system. Generally, program modules may include routines, programs, objects, components, logic, data structures, and so on that perform particular tasks or implement particular abstract data types. Computer system/server 602 may be practiced as one node of a distributed cloud computing environment, an example of which will be described with reference to FIG. 5. In such cloud computing environments, tasks are performed by remote processing devices that are linked through a communications network. In a distributed cloud computing environment, program modules 618 may be stored in one or more local and remote computer system storage media, including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606, in one embodiment, implements the functions of FIG. 2 through FIG. 5. The system memory 606 can include computer readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one computer program product having a set (e.g., at least one) of program modules 618 stored that are configured to carry out functions of various embodiments of the invention.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may be adapted to a networking environment. In some embodiments, program modules 618 carry out the functions and/or methodologies of various embodiments of the invention described herein.

With reference again to FIG. 6, computer system/server 602 may also communicate with one or more external devices 620 such as a keyboard, a pointing device, a display 622, etc. Such external devices 620 include one or more devices that enable a user to interact with computer system/server 602; and/or any devices (e.g., network card, modem, etc.) that enable computer system/server 602 to communicate with one or more other computing devices. Such communication/interaction can occur via I/O interfaces 624. In some embodiments, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention is described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing Environment

It is to be understood that although this disclosure includes a detailed description on cloud computing, implementation of the teachings recited herein are not limited to a cloud computing environment. Rather, embodiments of the present invention is capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 7:
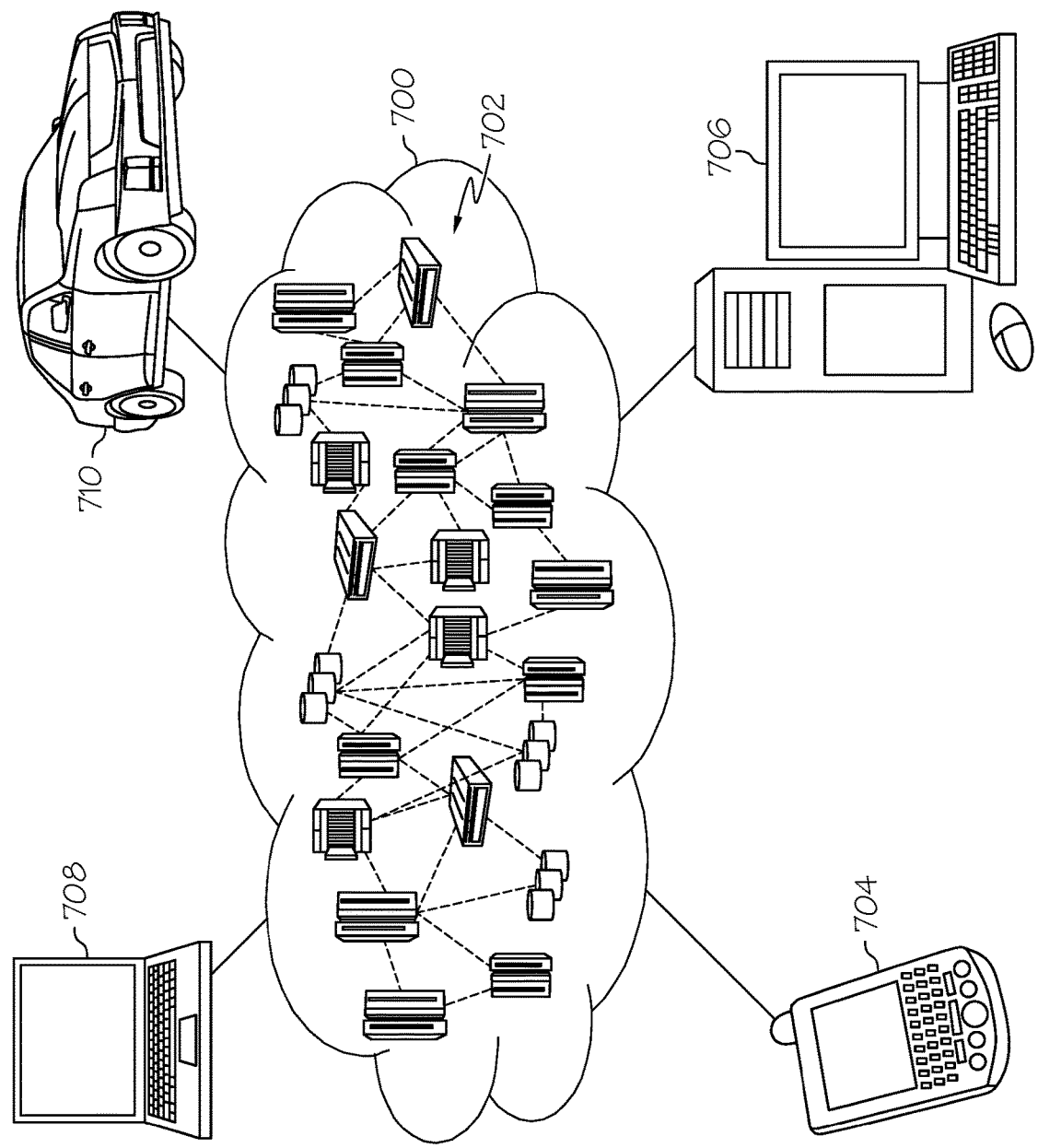
FIG. 7 depicts a cloud computing environment according to an embodiment of the present invention.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704, desktop computer 706, laptop computer 708, and/or automobile computer system 710 may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704, 706, 708, 710 shown in FIG. 7 are intended to be illustrative only and that computing nodes 702 and cloud computing environment 700 can communicate with any type of computerized device over any type of network and/or network addressable connection (e.g., using a web browser).

Figure 8:
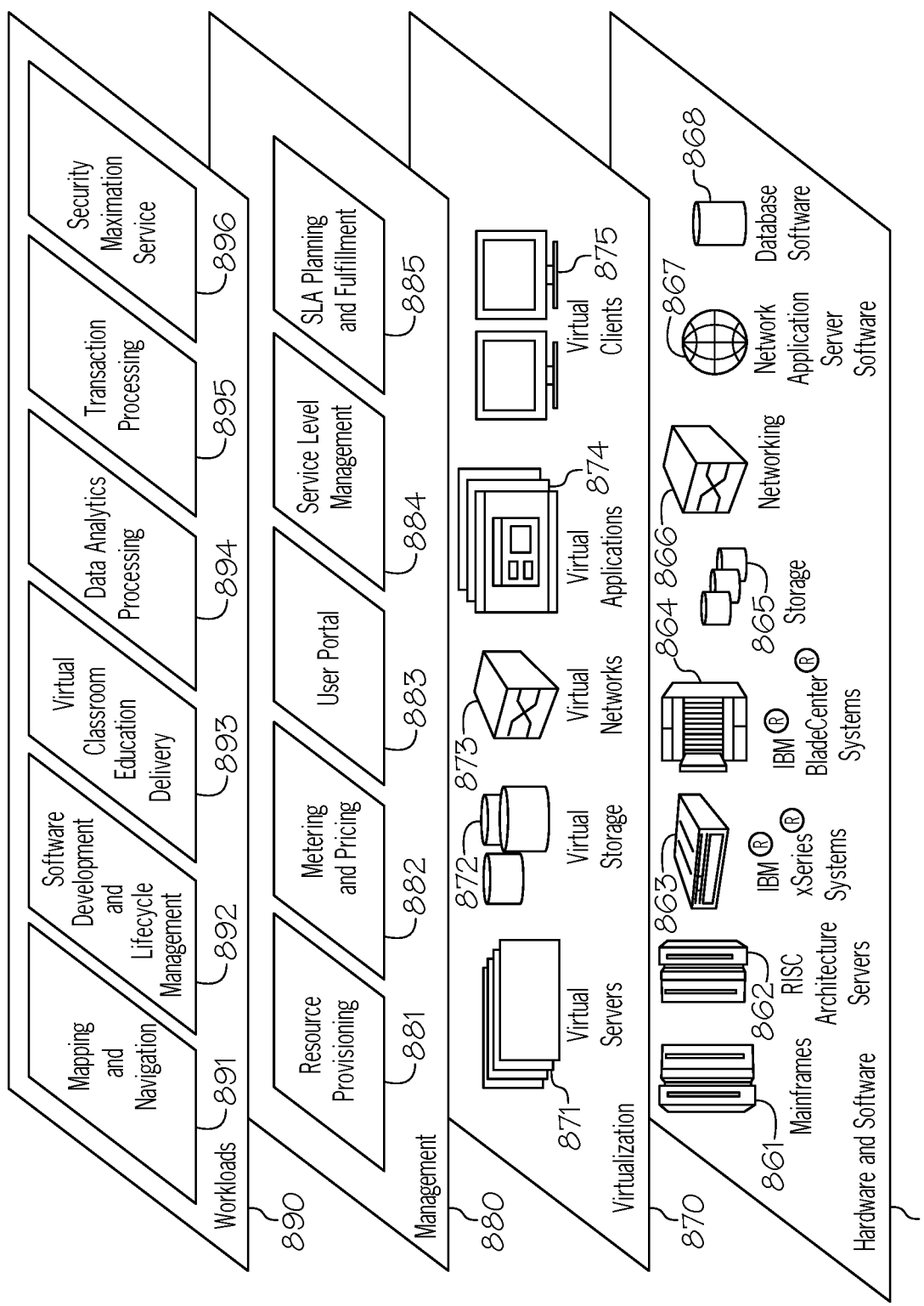
FIG. 8 depicts abstraction model layers according to an embodiment of the present invention.

Referring now to FIG. 8, an exemplary set of functional abstraction layers provided by cloud computing environment 700 is shown. It is understood in that the components, layers, and functions shown in FIG. 8 are illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and a security maximization for a computer related device with tax and/or auditing as part of a service 896 in accordance with an embodiment of the present invention.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for providing security between a user device and a computer related device, the method comprising:
    providing a computer related device with a distributed registry, a management node, a set of virtual machines, and a database, wherein the distributed registry specifies a plurality of services available to support communications between a user device and the computer related device on a communication network and the set of virtual machines forms nodes of a multi-node transient processing pathways between the user device and the database;
    presenting the plurality of services specified by the distributed registry to the user device;
    receiving, by the computer related device, a request from the user device for at least one particular service from the plurality of services, wherein the at least one particular service includes an additional requested service for at least one of an auditability service and a taxability service;
    at least one of dynamically constructing and altering, by the computer related device, one or more nodes of the multi-node transient processing pathways between the user device and the database based on the at least one particular service of the plurality of services;
    receiving, by the computer related device, a packet to call a given node at particular internet protocol (IP) address and particular port number for providing the at least one particular service along with the additional requested service;
    based on the receiving the packet, automatically changing, by the computer related device, each internet protocol (IP) address and port number of all other nodes that are unassociated with the particular IP address and particular port number; and
    providing, by the computer related device, the at least one particular service along with the additional requested service.

2. The computer-implemented method of claim 1, wherein the request from the user device for at least one particular service from the plurality of services includes using a zero-knowledge protocol to maintain privacy of a user of the user device and wherein audit records of the at least one of the auditability service and the taxability service are stored in the distributed registry with an access key which is divided up among three parties consisting of i) the user, ii) a provider of the at least one of the auditability service and the taxability service, and iii) a third party, whereby only two of the three parties must cooperate to reconstitute access to the audit records.

3. The computer-implemented method of claim 2, wherein the additional requested service includes withholding taxes for the at least one particular service.

4. The computer-implemented method of claim 3, further comprising:
    remitting, by one or more processors, the withholding taxes for the at least one particular service to a taxing authority.

5. The computer-implemented method of claim 4, wherein the withholding taxes are remitted by a third party using the zero-knowledge protocol, the third party being a different party from the user of the user device and a provider of the distributed registry.

6. The computer-implemented method of claim 1, further comprising:
    appending, by one or more processors, metadata describing a current cryptocurrency cost of each of the plurality of services to a descriptor of said each of the plurality of services; and
    receiving, by one or more processors, payment for services offered through the distributed registry associated with the communication network.

7. The computer-implemented method of claim 1, wherein the distributed registry is a blockchain, and wherein for at least one node in each of the multi-node transient processing pathways, an address thereof and a time period the at least one node is active and capable of being used is set or changed, based on at least one of an application programming interface type and a data request type implicated by a received packet.

8. The computer-implemented method of claim 1, wherein the additional requested service includes providing a transaction log of the at least one particular service using zero-knowledge verifiable computing, to a requesting party.

9. The computer-implemented method of claim 8, wherein the transaction log is provided by a third party using zero-knowledge verifiable computing, the third party being a different party from a user of the user device and a provider of the distributed registry.

10. The method of claim 1, wherein the providing the at least one particular service is performed using zero-knowledge verifiable computing is selected from the group consisting of a succinct computational integrity and privacy (SCIP) technique, a succinct non-interactive argument of knowledge (zk-snark) technique, and a probabilistically checkable proof (PCP) technique.

11. A system for providing security between a user device and a computer related device comprising:
    a memory;
    a processor communicatively coupled to the memory, where the processor is configured to perform
        providing a distributed registry that specifies a plurality of services available to support communications between a user device and a computer related device on a communication network;
        presenting the plurality of services specified by the distributed registry to the user device;
        receiving a request from the user device for at least one particular service from the plurality of services, wherein the at least one particular service includes an additional requested service for at least one of an auditability service and a taxability service;
        at least one of dynamically constructing and altering one or more multi-node transient processing pathways between the user device and the computer related device based on the at least one particular service of the plurality of services;

receiving a packet to call a given node at particular internet protocol (IP) address and particular port number for providing the at least one particular service along with the additional requested service;

based on the receiving the packet, automatically changing each internet protocol (IP) address and port number of all other nodes that are unassociated with the particular IP address and particular port number; and providing the at least one particular service along with the additional requested service.

12. The system of claim 11, wherein the request from the user device for at least one particular service from the plurality of services includes using a zero-knowledge protocol to maintain privacy of a user of the user device and wherein audit records of the at least one of the auditability service and the taxability service are stored in the distributed registry with an access key which is divided up among three parties consisting of i) the user, ii) a provider of the at least one of the auditability service and the taxability service, and iii) a third party, whereby only two of the three parties must cooperate to reconstitute access to the audit records.

13. The system of claim of claim 12, wherein the additional requested service includes withholding taxes for the at least one particular service.

14. The system of claim 13, further comprising:
remitting the withholding taxes for the at least one particular service to a taxing authority.

15. The system of claim 14, wherein the withholding taxes are remitted by a third party using the zero-knowledge protocol, the third party being a different party from the user of the user device and a provider of the distributed registry.

16. The system of claim 11, further comprising:
appending metadata describing a current cryptocurrency cost of each of the plurality of services to a descriptor of said each of the plurality of services; and
receiving payment for services offered through a distributed registry associated with the communication network.

17. The system of claim 11, wherein the distributed registry is a blockchain, and wherein for at least one node in each of the multi-node transient processing pathways, an address thereof and a time period the at least one node is active and capable of being used is set or changed, based on at least one of an application programming interface type and a data request type implicated by a received packet.

18. The system of claim 11, wherein the additional requested service includes providing a transaction log of the at least one particular service using zero-knowledge verifiable computing, to a requesting party.

19. The system of claim 18, wherein the transaction log is provided by a third party using zero-knowledge verifiable computing, the third party being a different party from a user of the user device and a provider of the distributed registry.

20. A computer program product for providing security between a user device and a computer related device comprising a computer readable storage medium having computer readable program code embodied therewith, the computer readable program code configured to perform:

providing a distributed registry that specifies a plurality of services available to support communications between a user device and a computer related device on a communication network;

presenting the plurality of services specified by the distributed registry to the user device;

receiving a request from the user device for at least one particular service from the plurality of services, wherein the at least one particular service includes an additional requested service for at least one of an auditability service and a taxability service;

at least one of dynamically constructing and altering one or more multi-node transient processing pathways between the user device and the computer related device based on the at least one particular service of the plurality of services;

receiving a packet to call a given node at particular internet protocol (IP) address and particular port number for providing the at least one particular service along with the additional requested service;

based on the receiving the packet, automatically changing each internet protocol (IP) address and port number of all other nodes that are unassociated with the particular IP address and particular port number; and providing the at least one particular service along with the additional requested service.

* * * * *